United States Patent
Neuhengen

(12)
(10) Patent No.: US 6,702,537 B2
(45) Date of Patent: Mar. 9, 2004

(54) HIGH PROFILE THREAD FORMING SCREW

(75) Inventor: Ken Neuhengen, Niles, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/759,693

(22) Filed: Jan. 12, 2001

(65) Prior Publication Data

US 2002/0094255 A1 Jul. 18, 2002

(51) Int. Cl.[7] .................................................. F16B 35/04
(52) U.S. Cl. .......................................... 411/414; 411/411
(58) Field of Search ................................ 411/411, 414, 411/416, 387.4

(56) References Cited

U.S. PATENT DOCUMENTS

| | | | | |
|---|---|---|---|---|
| 3,726,330 A | * | 4/1973 | Adler | 411/411 |
| 3,748,949 A | * | 7/1973 | Dreger | 411/411 |
| 4,544,313 A | | 10/1985 | Grossberndt | |
| 5,061,135 A | * | 10/1991 | Pritchard | 411/411 |
| 5,110,245 A | * | 5/1992 | Hiroyuki | |
| 5,304,023 A | * | 4/1994 | Toback | 411/414 |
| 6,113,331 A | * | 9/2000 | Grosberndt | 411/411 |

FOREIGN PATENT DOCUMENTS

| | | | |
|---|---|---|---|
| GB | 1357720 | * | 6/1974 |
| GB | 2131907 | * | 6/1984 |
| WO | 98/04719 | | 7/1998 |
| WO | 98/04720 | | 7/1998 |

OTHER PUBLICATIONS

"Delta PT", EJOT Verbindungstechnik, Jun. 27, 2000.

* cited by examiner

*Primary Examiner*—Flemming Saether
(74) *Attorney, Agent, or Firm*—Mark W. Croll; Paul F. Donovan

(57) ABSTRACT

A thread forming screw configured for insertion into relatively hard plastics includes an elongated core region having two ends, a head at one end and a point at the opposite end, a helical thread extending generally radially from the core region, the thread being asymmetrical when viewed in a cross-section taken through a diameter of the core, the thread defining a flank angle made up of a leading angle, facing the point, and a trailing angle facing the head, the leading angle being greater than the trailing angle.

16 Claims, 1 Drawing Sheet

HIGH PROFILE THREAD FORMING SCREW

BACKGROUND OF THE INVENTION

The present invention relates generally to self-tapping or thread forming screws, and more specifically to such screws which are designed for engagement or insertion into relatively hard plastic material.

Thread forming screws are known for use with a wide variety of materials, including sheet metal and plastics. Typically, the screws of this type which are designed for use in plastics are configured for use in relatively soft thermoplastic materials, which are characterized by the property of deforming a certain extent into the gap between adjacent thread ridges. Such screws typically have a relatively high profile thread, or a large major to minor diameter differential when the diameter of the threads is compared with the diameter of the core or shank. This differential is intended to prevent the flow of displaced plastic into the area around the core.

Another design criteria of such screws is to increase the amount of loosening torque required to remove the screw, to prevent unwanted unthreading. One approach is to make the thread of the screw asymmetrical, with the threads having a straight edge on one side and a sharp bend on the other side. International Application No. 99/06715 (PCT/EP98/04719) discloses a variety of thread configurations in which, instead of being straight, at least one of the thread edges has a designated angle formed in the edge. The variety of configurations is intended to provide threads which are more suitable for various types of plastics, and the angle formed on each edge is intended to provide a space closer to the screw core into which displaced plastic may flow when the screw is turned in the plastic material.

International application No. 99/06719 (PCT/EP98/04720) discloses a thread forming screw with a flank angle of 30° and a relatively thick core for the diameter of the thread ridges. In addition, the thread ridges are relatively widely spaced. In that application, the thread surfaces are straight, i.e., not angled.

It has been found that when screws designed for use with relatively soft plastics, in which the soft plastic material is displaced toward the core of the screw, are employed in relatively hard plastics such as thermoplastics, including glass-filled, talc-filled or other types of thermoplastics as well as equivalently hard engineered materials, the screws have a tendency to crack the plastic into which they are being threaded. While standard sheet metal screws have a thread flank angle of approximately 60°, this size flank angle has been found to contribute to the cracking problem. As exemplified by U.S. Pat. No. 4,544,313, thread forming screws for use in plastics have been disclosed with flank angles in the range of 30° to reduce stress on the plastic. However, these are generally disclosed with symmetrical thread configurations, i.e., symmetrical about a line perpendicular to the axis of the core which passes through the apex of the thread.

As also disclosed in U.S. Pat. No. 6,113,331 by decreasing the flank angle, more threads per inch may be provided, which increases the required tear-out force. A high tear-out force requires a stronger screw, and this property is typically achieved by increasing the diameter of the core or using costlier, highly tempered materials. However, large diameter cores have not always been considered suitable for use in plastics, since relatively small diameter cores have been thought to provide a larger area for receiving displaced softer plastics.

Accordingly, it is a first object of the present invention to provide an improved thread forming screw which is designed for use in relatively hard plastics but will not cause cracking of the plastic upon insertion.

Another object of the present invention is to provide an improved thread forming screw which is designed to have increased resistance to pullout.

BRIEF SUMMARY OF THE INVENTION

The above-listed objects are met or exceeded by the present high profile thread forming screw, which features an asymmetric thread profile forming a flank angle of approximately 30° which reduces the tendency to crack relatively hard plastics. Another feature of the present fastener is that it has a relatively small pitch compared to conventional fasteners, which allows more threads per inch, increasing pullout resistance. In addition, the core diameter is sufficiently large to provide the necessary strength to withstand the increased pullout resistance.

More specifically, the present invention provides a thread forming screw configured for insertion into relatively hard plastics and includes an elongated core region having two ends, a head at one end and a point at the opposite end. A helical thread extends generally radially from the core region, the thread being asymmetrical when viewed in a cross-section taken through a diameter of the core, and defining a flank angle made up of a leading angle, facing the point, and a trailing angle facing the head. The leading angle is greater than the trailing angle.

In the preferred embodiment, the leading angle is approximately 20° and the trailing angle is approximately 10°. In addition, the thread has an outside diameter and the core has an outside diameter, and a ratio of the outside diameter of the thread to the outside diameter of the core is approximately 1.30:1. The thread, specific to a M5.0 screw, has a pitch range of approximately 1.15 mm to 1.35 mm, which is reduced from conventional screws having pitch ranges on the order of 2.25 mm.

DETAILED DESCRIPTION OF THE INVENTION

Figure 1:
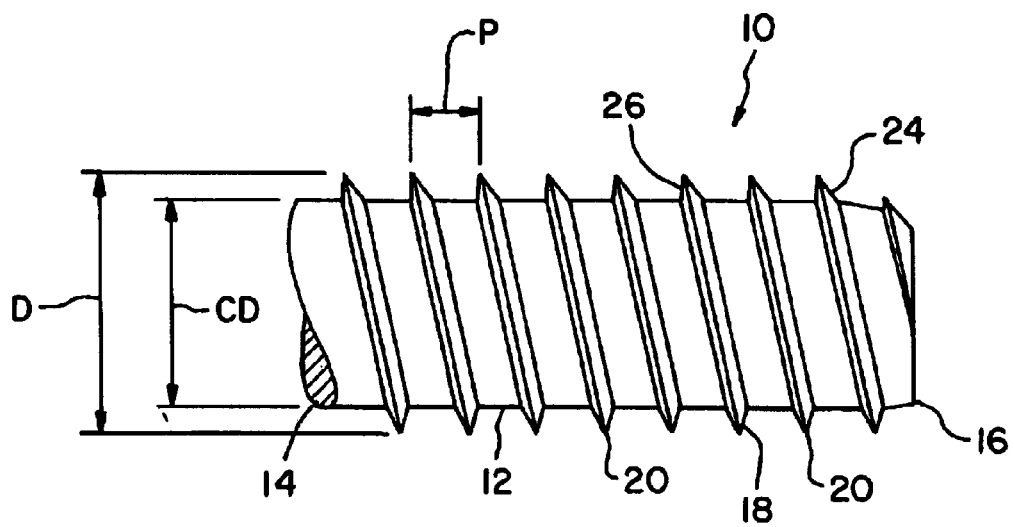
FIG. 1 is a fragmentary front elevational view of the present fastener, showing the thread profile.
Figure 2:
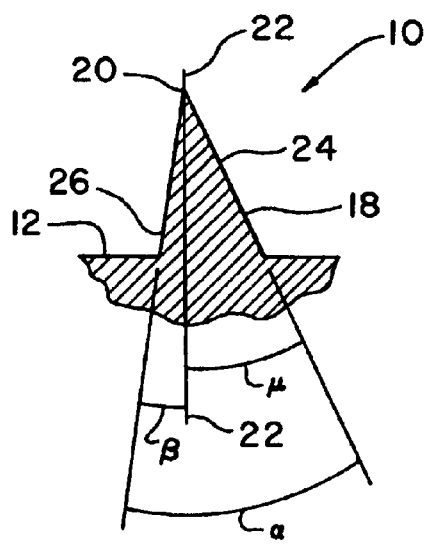
FIG. 2 is a fragmentary enlarged vertical sectional view of a single thread ridge of the fastener of FIG. 1.

Referring now to FIGS. 1 and 2, a screw incorporating the features of the present invention is generally designated 10, and is configured for use in relatively hard plastics. For the purposes of this application, "relatively hard plastics" refers to thermoplastics, including glass-filled, talc-filled or other types of thermoplastics as well as equivalently hard engineered materials. The screw 10 includes an elongated core or core region 12 which is generally cylindrical in shape and has two ends, a head end 14 typically joined to a head (not shown) and a point end 16 opposite the head end. As is typical with such thread forming or self threading (the terms are considered equivalent in this application) screws, the point end 16 is provided with a point (not shown) which is often narrowed or even sharpened to facilitate insertion into a desired substrate, in this case relatively hard plastic. In this embodiment, the point end 16 is gradually tapered over a 1 to 2 pitch distance (described in detail below), forming what is known as a semi-gimlet point, however other known point configurations are contemplated. In the preferred embodiment, the screw 10 is made of low carbon steel which is straight hardened, however other materials are contemplated as are known in the art.

Also included on the screw 10 is a helical thread 18 extending generally radially from the core region 12 and forming a plurality of thread ridges 20. Referring now to FIG. 2, an important feature of the present screw 10 is that the thread 18 is asymmetrical when viewed in a cross-section taken through a diameter of the core. More specifically, when viewed relative to a diameter 22 passing through a thread ridge 20, the thread has a greater angle on the edge facing the point end 16 than the angle facing the head end 14. For purposes of this application, the thread edge 24 facing the point end 16 will be referred to as the leading edge, and the thread edge 26 facing the head end will be referred to as the trailing edge.

An important feature of the present screw is that a flank angle $\alpha$, defined by the leading edge 24 and the trailing edge 26, is approximately 30°, which has been found to cause less cracking of harder plastic as compared to competitive screws with larger flank angles. It should be noted that the leading edge 24 and the trailing edge 26 are preferably linear or straight, and are not angled mid-length as in some prior art screws.

In the preferred embodiment, the asymmetric configuration of the thread 20 is formed by a leading angle $\mu$ defined by the leading edge 24 and the diameter 22, and a trailing angle $\beta$ defined by the trailing edge 26 and the diameter 22, which combine to form the flank angle $\alpha$. It has been found that by providing the relatively smaller trailing angle $\beta$, that resistance to pullout is increased over prior configurations. In the preferred embodiment, the leading angle $\mu$ is approximately twice the size of the trailing angle $\beta$. More specifically, the leading angle $\mu$ is approximately 20°, and the trailing angle $\beta$ is approximately 10°. For the purposes of the present invention, it is contemplated that the acceptable range of the leading angle $\mu$ is 20°+/−2°, and the trailing angle $\beta$ is 10°+/−1°.

Another feature of the present screw 10 is that the pitch of its thread 18, or the distance P between adjacent thread ridges 20, is relatively small. In the preferred embodiment, the pitch P, specific to a M5.0 screw, is preferably in a pitch range of approximately 1.15 mm to 1.35 mm, with 1.25 mm being preferred, with the pitch range having a tolerance of +/−0.10 mm. As described above, a smaller pitch range is believed to increase resistance to pullout forces.

Another characteristic of the screw 10 is that the thread 18 has an outside diameter D, and the core region 12 has a relatively smaller outside diameter CD, such that, in the preferred embodiment, a ratio of the outside diameter D to the outside diameter CD of the core 12 is approximately 1.30:1. This means that the core diameter CD is relatively thick compared to the thread diameter, thus increasing the strength of the screw 10, and reducing its tendency to shear during installation. Considered another way, the screw 10 has an outside diameter D and a pitch P, a ratio of D to P is approximately 4.00:1.

An example of a screw 10 manufactured according to the present invention is described in the art as a M5.0 screw and is approximately 16.00 mm long, the thread has an outside diameter in the approximate range of 5.0 to 5.25 mm, and the core has a diameter in the approximate range of 3.80 to 4.00 mm. Other suitable examples of screws incorporating the invention are M4.0 screws, with a pitch range of approximately 0.90 mm to 1.10 mm, a length of approximately 1.0 mm, an outside diameter in the range of 4.0 and 4.25 mm and a core diameter in the approximate range of 3.0 to 3.20 mm.

Yet another suitable example of a screw incorporating the present invention is a screw referred to as a M6.0 screw, with a pitch range of approximately 0.40 to 1.60 mm, preferably 1.50 mm, a thread with an outside diameter in the approximate range of 6.0 to 6.25 mm and a core diameter in the approximate range of 4.6 to 4.8 mm. It has been found that, when used in relatively harder plastics, there is not as much flow of the material due to the insertion of the screw as in relatively softer plastic materials, so the core diameter CD can be larger compared to the thread diameter D. Hence, the thread profile of the present screw 10 is relatively short.

Thus it will be seen that the present screw 10 is configured especially for use in a thread forming application in relatively hard plastics. The asymmetric thread profile, with the leading angle being approximately twice the size of the trailing angle, the relatively large core diameter, the straight sides of the leading and trailing edges 24, 26, respectively, and the short thread pitch all combine to make a unique screw which is especially suited to its application.

While a particular embodiment of the high profile thread forming screw of the invention has been shown and described, it will be appreciated by those skilled in the art that changes and modifications may be made thereto without departing from the invention in its broader aspects and as set forth in the following claims.

What is claimed is:

1. A thread forming screw configured for insertion into relatively hard plastics, comprising:
   an elongated core having two ends, a head at one end and a point at the opposite end, said core further having an outside diameter;
   a helical thread extending generally radially from said core, said helical thread including a thread ridge, a flat leading edge facing said point and a trailing edge facing said head, said leading edge extending from said outside diameter of said core to said ridge and being substantially flat throughout, said thread being asymmetrical when viewed in a cross-section taken through a diameter of said core, said thread defining a flank angle made up of a leading angle, facing said point, and a trailing angle facing said head, said leading angle being greater than said trailing angle, wherein said thread further includes an outside diameter such that a ratio of said outside diameter of said thread to said outside diameter of said core is within the range of 1.25:1 to 1.4:1.

2. The screw as defined in claim 1 wherein said flank angle is approximately 30°.

3. The screw as defined in claim 1 wherein said leading angle is approximately twice said trailing angle.

4. The screw as defined in claim 3 wherein said leading angle is approximately 20° and said trailing angle is approximately 10°.

5. The screw as defined in claim 3 wherein said leading angle is 20°+/−2° and said trailing angle is 10°+/−1°.

6. The screw as defined in claim 1 wherein said thread, specific to M5.0 screws, has a pitch range of approximately 1.15 mm to 1.35 mm.

7. The screw as defined in claim 6 wherein said pitch range has a tolerance of +/−10 mm.

8. The screw as defined in claim 1 wherein said thread has an outside diameter and a pitch, a ratio of said outside diameter of said thread and said pitch is approximately 4.00:1.

9. The screw as defined in claim 1 wherein said core is generally cylindrical in shape.

10. The screw as defined in claim 1 wherein said screw pitch is approximately 1.25 mm long, said thread, specific to M5.0, has an outside diameter in the approximate range of 5.0 to 5.25 mm, and said core has a diameter in the approximate range of 3.80 to 4.00 mm.

11. The screw as defined in claim 1 wherein said thread, specific to M4.0 screws, has a pitch range of approximately 0.90 mm to 1.10 mm.

12. The screw as defined in claim 1 wherein said screw pitch is approximately 1.00 mm long, said thread, specific to M4.0 screws, has an outside diameter in the approximate range of 4.0 to 4.25 mm and said core has a diameter in the approximate range of 3.0 to 3.20 mm.

13. The screw as defined in claim 1 wherein said thread, specific to M6.0 screws, has a pitch range of approximately 1.40 mm to 1.60 mm.

14. The screw as defined in claim 1 wherein said screw pitch is approximately 1.50 mm long, said thread, specific to M6.0 screws, has an outside diameter in the approximate range on 6.0 to 6.25 mm and said core has a diameter in the approximate range of 4.6 to 4.8 mm.

15. A thread forming screw configured for insertion into relatively hard plastics comprising:

an elongated core having two ends, a head at one end and a point at the opposite end, said core further having an outside diameter;

a helical thread extending generally radially from said core, said thread having an outside diameter and a pitch such that a ratio of said outside diameter of said thread and said pitch is within the range of 3.3:1 to 5.3:1, said thread further having a ridge and a substantially flat leading edge extending from said outside diameter of said core to said ridge and being asymmetrical when viewed in a cross-section taken through a diameter of said core, said thread defining a flank angle made up of a leading angle defined by a diameter of said core and said leading edge, facing said point, and a trailing angle defined by a diameter of said core and a trailing edge facing said head, said leading angle being greater than said trailing angle; and said leading angle is approximately 20° and said trailing angle is approximately 10°.

16. A thread forming screw configured for insertion into relatively hard plastics, comprising:

an elongated core having two ends, a head at one end and a point at the opposite end, said core further having an outside diameter;

a helical thread extending generally radially from said core, said thread having a ridge and a leading edge facing said point, said leading edge being substantially flat from said outside diameter of said core to said ridge, and said thread being asymmetrical when viewed in a cross-section taken through a diameter of said core, said thread defining a flank angle made up of a leading angle defined by a diameter of said core and said leading edge and a trailing angle defined by a diameter of said core and a trailing edge facing said head, said leading angle being greater than said trailing angle; and said leading angle is approximately 20° and said trailing angle is approximately 10°, said thread has an outside diameter and said core has an outside diameter, a ratio of said outside diameter of said thread to said outside diameter of said core is 1.30:1 and said thread, specific to a M5.0 screw, has a pitch range of 1.15 mm to 1.35 mm.

* * * * *